(12) United States Patent
Fuchs et al.

(10) Patent No.: US 10,226,990 B2
(45) Date of Patent: Mar. 12, 2019

(54) TAILGATE WITH REVERSING CAMERA

(71) Applicant: GM GLOBAL TECHNOLOGY OPERATIONS LLC, Detroit, MI (US)

(72) Inventors: Michael Fuchs, Ruesselsheim (DE); Friedrich Hein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/581,103

(22) Filed: Apr. 28, 2017

(65) Prior Publication Data
US 2017/0313167 A1    Nov. 2, 2017

(30) Foreign Application Priority Data

Apr. 30, 2016   (DE) .................... 10 2016 005 287

(51) Int. Cl.
| | |
|---|---|
| *B60J 5/10* | (2006.01) |
| *B60R 25/01* | (2013.01) |
| *B60R 11/04* | (2006.01) |
| *B60R 11/00* | (2006.01) |

(52) U.S. Cl.
CPC .............. *B60J 5/107* (2013.01); *B60R 11/04* (2013.01); *B60R 25/01* (2013.01); *B60R 2011/004* (2013.01); *B60R 2011/0082* (2013.01)

(58) Field of Classification Search
CPC .......... B60J 5/107; B60R 11/04; B60R 25/01; B60R 2011/004; B60R 2011/0082
USPC ....................................................... 296/146.8
See application file for complete search history.

(56) References Cited

U.S. PATENT DOCUMENTS

| | | | |
|---|---|---|---|
| 8,836,789 B2 | 9/2014 | Liepold et al. | |
| 2006/0256459 A1* | 11/2006 | Izabel ................... | B60R 11/04 359/872 |
| 2013/0088599 A1 | 4/2013 | Ulomek et al. | |
| 2013/0235204 A1 | 9/2013 | Buschmann | |
| 2016/0236558 A1 | 8/2016 | Koseki et al. | |

FOREIGN PATENT DOCUMENTS

| | | | | |
|---|---|---|---|---|
| DE | 102008010966 A1 * | 8/2009 | ............ | B60R 11/04 |
| DE | 102008010966 A1 | 8/2009 | | |

OTHER PUBLICATIONS

German Patent Office, German Search Report for German Application No. 102016005287.2, dated Mar. 14, 2017.

* cited by examiner

*Primary Examiner* — Joseph D. Pape
*Assistant Examiner* — Dana D Ivey
(74) *Attorney, Agent, or Firm* — Lorenz & Kopf, LLP

(57) ABSTRACT

A tailgate for a vehicle includes an outer skin and a grip recessed into the outer skin, which open towards the bottom when the tailgate in a closed position. A wall of the recessed grip is formed at least in part by a cover of an extendable mounting for a camera. The camera is positionable between a retracted position in which the cover conceals the camera and an extended position in which the camera provides a field of view behind the vehicle.

19 Claims, 4 Drawing Sheets

TAILGATE WITH REVERSING CAMERA

CROSS-REFERENCE TO RELATED APPLICATION

This application claims priority to German Patent Application No. 102016005287.2, filed Apr. 30, 2016, which is incorporated herein by reference in its entirety.

TECHNICAL FIELD

The present disclosure pertains to a tailgate for a motor vehicle with integrated reversing or back-up camera.

BACKGROUND

DE 10 2010 045 214 A1 discloses a camera arrangement for installation in a tailgate having a grip integrated therein. In order for a user gripping the grip to exert the force necessary for opening the tailgate, the grip has to be recessed into a surface of the tailgate which is approximately orientated tangentially to its pivot axis.

Many tailgates also have a recess which receives a number plate. Their upper edge generally has an orientation that is suitable for attaching the recessed grip. However, this upper edge also has a high tendency for getting dirty for swirled-up dust and dirt that settles on the tailgate. In addition, rain has a tendency to flushed dust off the steep regions of the tailgate which settles on the less steep regions, specifically the upper edge where protrusions of the camera arrangement are directed downwards. Such a protrusion is formed by a cover which has to be folded open for extending the camera but is at risk of sticking through adhering dirt. Since the dirty rain water does not flow upwards into the recessed grip, the recessed grip itself remains relatively clean but a user attempting to open the tailgate reaches next to the recessed grip can easily dirty his or her fingers. The probability for this is quite high with the known camera arrangement given the limited width of the upper edge and the need for accommodating the camera arrangement as well as the number plate illumination and since the flap arranged next to the recessed grip takes up space, which is consequently not available for the recessed grip.

Accordingly, there is a need in the art for a tailgate with recessed grip and reversing camera, with which the probability of comfort impairment of malfunctioning due to dirt accumulation is reduced

SUMMARY

In accordance with the present disclosure, a tailgate for a vehicle is provided with an outer skin and a grip recessed into the outer skin, which is open towards the bottom with the tailgate in the closed position. A wall of the recessed grip is formed at least in part by a cover of an extendable mounting of the camera. Being part of the wall of the recessed grip, the cover is protected from dirt flushed along by dirty rain water, which might cause sticking. Additionally, the cover, which does not reduce the space available, can be made relatively wide so that the probability that a user inadvertently reaches next to the recessed grip is low even in particular when he is unable to directly see the recessed grip. Furthermore, the cover, which is incorporated in the recessed grip, can be placed in the middle of the tailgate which in turn facilitates locating the recessed grip even when it is not directly visible.

The lid may include a pushbutton through which a lock of the tailgate is controllable, so that the pushbutton can be incidentally actuated when reaching into the recessed grip in order to unlock the tailgate. The pushbutton may form a part of the cover or of the entire cover.

Preferably, the pushbutton controls the lock electrically. A switch that is actuatable by the pushbutton is practical installed in the mounting so that it is moveable with the same.

The cover has preferably a roof-shaped or peaked cross section with a steep flank facing the vehicle interior and a less steep flank facing the vehicle exterior. This makes possible a compact construction since a short adjusting travel of the camera is sufficient in order to extend the same out of the tailgate for provided a clear vision to the back.

A further part of the recessed grip can be formed by a molding on which the mounting is moveably guided. This molding may include a channel which engages in a cut-out of the outer skin. The molding can include a flange extending about the channel and covering an edge of the cut-out for establishing the installation position. Threaded rods project from the flange and extend through openings of the outer skin for anchoring in the outer skin.

The molding may include a shaft that is open towards the interior of the channel from in an extended position of the camera and closed by the cover in a retracted position of the camera. In order to guide the movement of the camera and its mounting, a wall of the shaft may include an elongated recess in the movement direction of the camera, in which a protrusion of the mounting engages. In order to simply the assembly of camera and mounting in the shaft, the protrusion can be configured resiliently transversely to the wall be latched in the recess.

A worm gear that is elongated in movement direction can be provided for driving the movement of the camera. A motor driving the movement of the camera can be space-savingly accommodated in a corner delimited by the shaft and a part of the channel standing away from the shaft.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
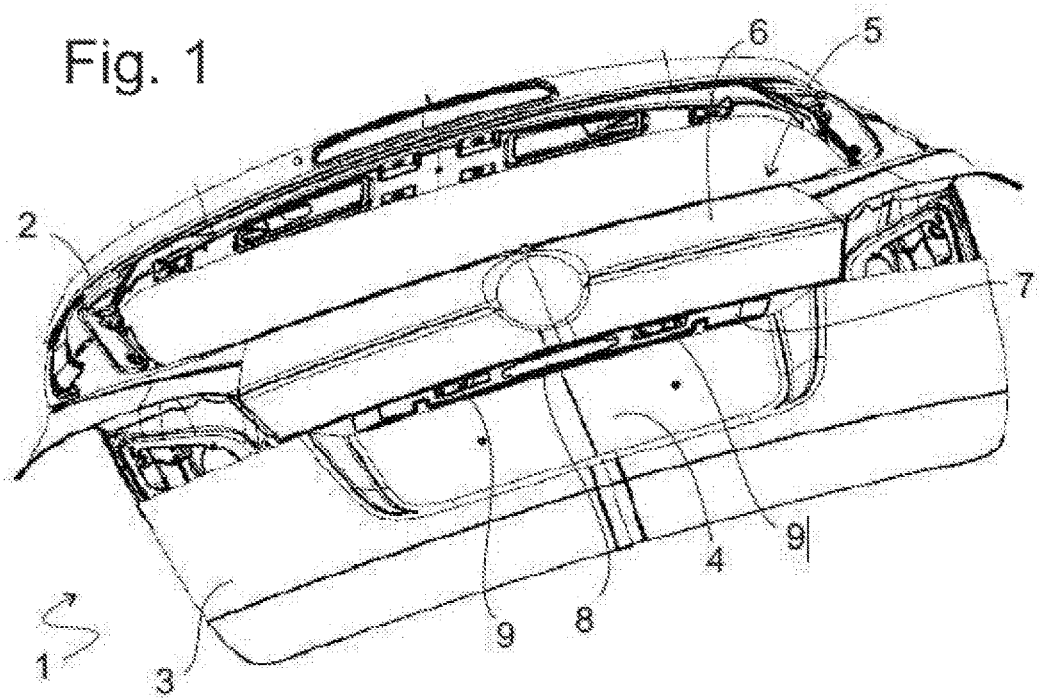
FIG. 1 shows a tailgate according to the present disclosure.

FIG. 1 shows a tailgate 1 for a motor vehicle in wagon design. The upper part of the tailgate 1 is formed by a large window frame 2. In an outer panel 3 forming the lower part of the tailgate 1, a central indentation 4 for a number plate is formed. An outer skin element 5 facing the outer panel 3 has an angular cross section with an upper leg 6, which downwards adjoins the window frame 2. The outer skin element 5 joins the outer panel 3 on lateral ends on both sides of the central indentation 4 in a flush manner. A lower leg 7 of the outer skin element 5 forms an upper edge of the indentation 3 and in the closed position of the tailgate 1 is orientated approximately horizontally. From the perspective of a user standing in front of the tailgate 1 in order to open it, the lower leg 7 is not visible. Alternatively, the leg 7 can also be a unitary part of the outer panel 3.

Three openings of the leg 7 are visible in FIG. 1, a central opening 8 and two openings 9 on the left and right of the central opening which are mirrored relative to one another. The openings 9 are provided in order to receive lamps for illuminating a number plate mounted in the recess 4. The central opening 8 is provided in order to receive a camera assembly described in detail by way of the following figures.

Figure 2:
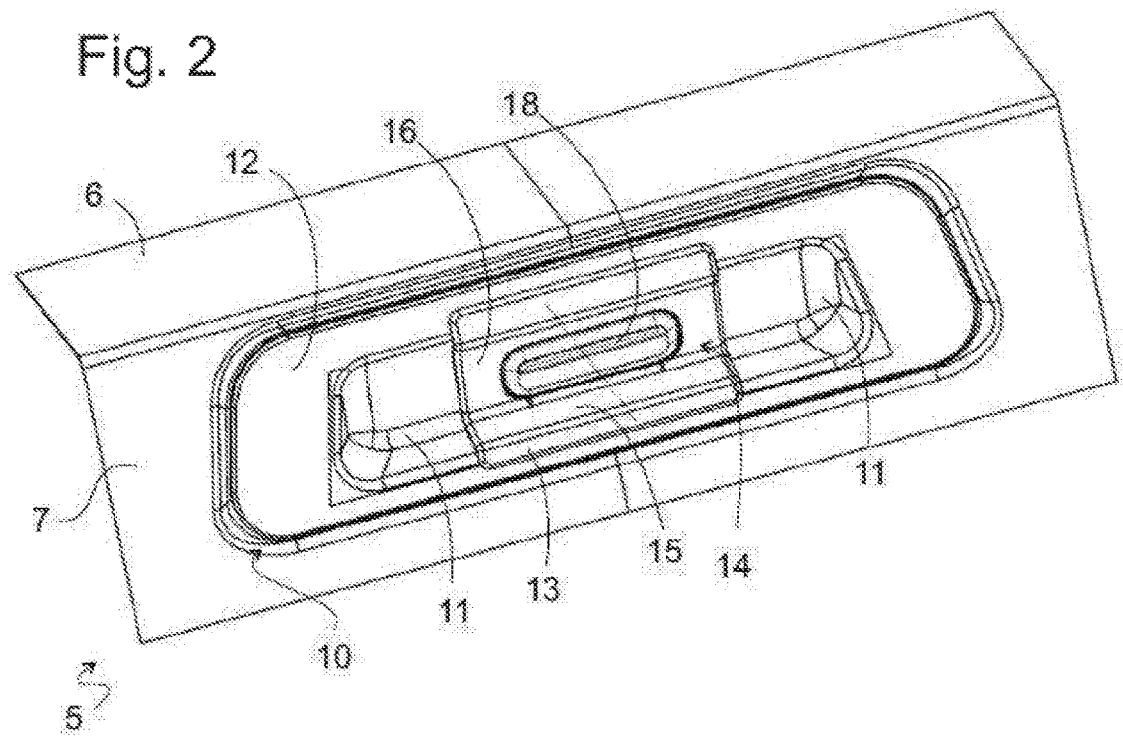
FIG. 2 is a detail of the tailgate with a camera assembly in retracted position.

FIG. 2 shows an extract of the leg 7 from a perspective obliquely from below. In the opening 8, a molding 10 made of plastic is recessed. It includes a central channel 11 which in the closed position of the tailgate 1 is open towards the bottom and a flange 12 surrounding the channel 11, which all around the opening 8 lies against the leg 7.

A middle portion of the channel 11 is concealed behind a cover 13. The cross-sectional contour of the cover 13 follows that of the channel 11, so that both together delimit a contiguous recessed grip 14 that is open towards the bottom extending over the entire length of the channel 11. Since the recessed grip 14 crosses the middle plane of the tailgate 1 and can extend on both sides of the middle plane over a large part of the width of the indentation 4 as far as into the vicinity of the openings 9, the recessed grip 14 can be easily and securely found by a user even when the leg 7 is concealed from his viewing direction.

The cover 13, in the exemplary embodiment considered here, extends only over approximately a third of the length of the channel 11. However, it is possible to widen the same so that it completely covers the channel 11 or even the flange 12.

Figure 3:
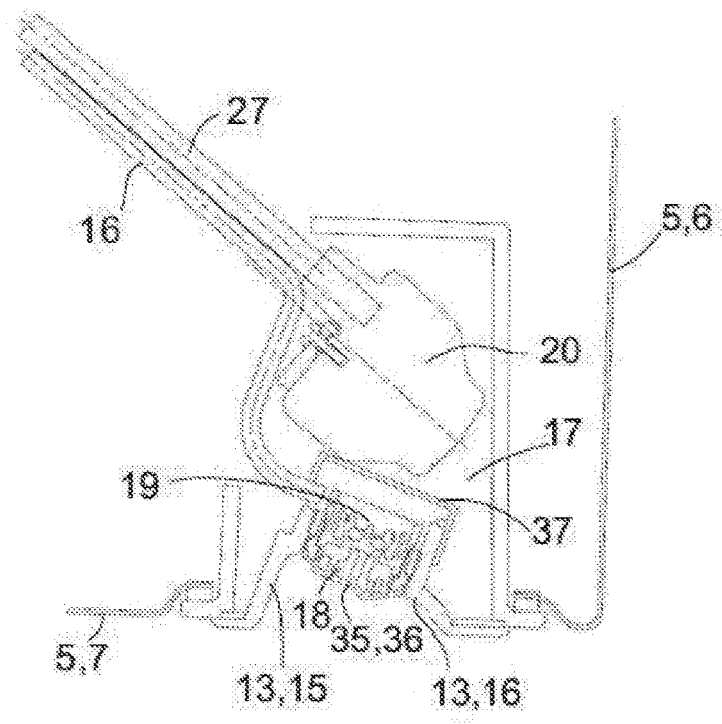
FIG. 3 shows a section in vehicle longitudinal direction through the camera assembly in retracted position.

Like the channel 11, the cover 13 has a roof-like or peaked cross section that is more clearly noticeable in FIG. 3 with a steep flank 15 on its side facing the indentation 4 or the vehicle interior and a shallow or flatter flank 16 on its side facing the leg 6. The flank 16 is orientated approximately perpendicularly to the direction of the pulling force which the user exerts for opening the tailgate 1, thus facilitating exerting said force. In the position shown in FIG. 2, the cover 13 closes a shaft 17 of the molding 10.

A part of the flange 16 is taken up by a pushbutton 18. This pushbutton 18 actuates an electrical switch 19, which together with a camera 20 is mounted in a mounting 21 (see FIGS. 4, 7), of which the cover 13 is a part. A signal of the switch 19 controls the unlocking of a lock which is not shown in the figures and known per se on the lower edge of the tailgate 1, so that when the user reaches into the recessed grip 14 in order to lift the tailgate 1, he or she simultaneously activates the switch 19 and the lock is unlocked. According to a version, the entire cover 13 could serve as pushbutton 18.

Figure 4:
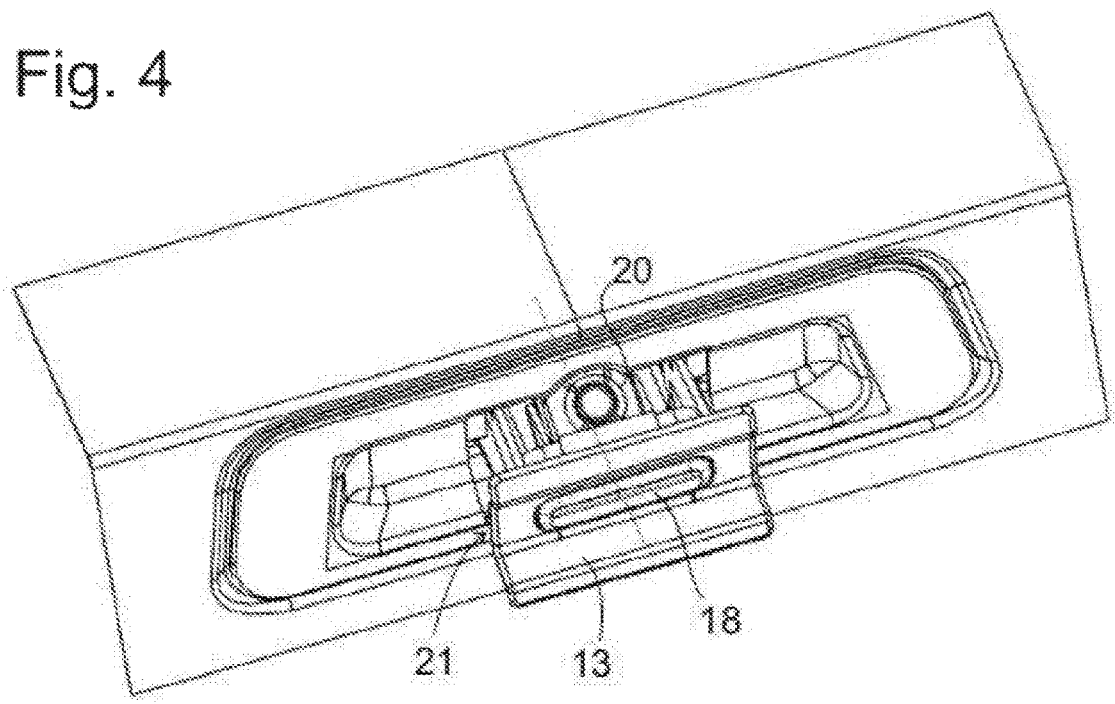
FIG. 4 is a detail similar to FIG. 2 with the camera assembly in extended position.
Figure 5:
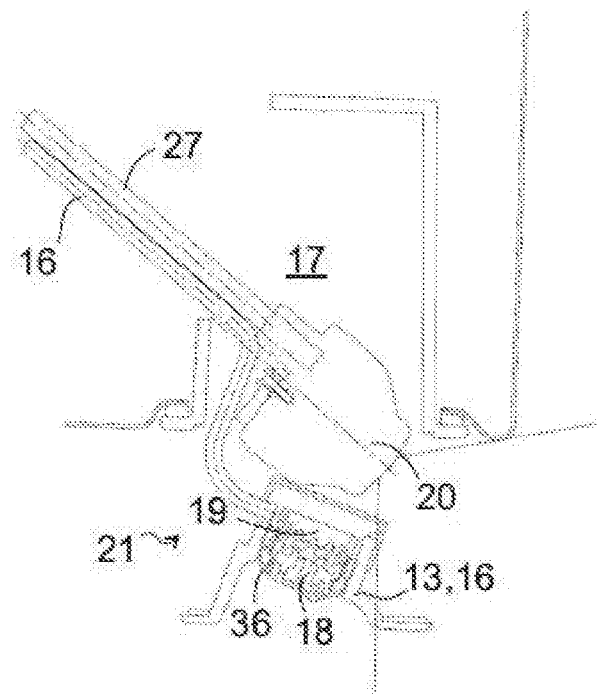
FIG. 5 shows a section through the camera assembly in extended position.

The mounting 21 is extendable into an open position out of the shaft 17 downwards, which position is shown in FIGS. 4 and 5. In the extended position, the camera 20 has clear vision obliquely downwards of the road located below the vehicle and any obstacles behind the vehicle. Since the optical axis of the camera 20 slopes downwards towards the back, the camera 20 can be mounted in the mounting 21 closely adjacently to the flank 16 sloping in the same manner.

Figure 6:
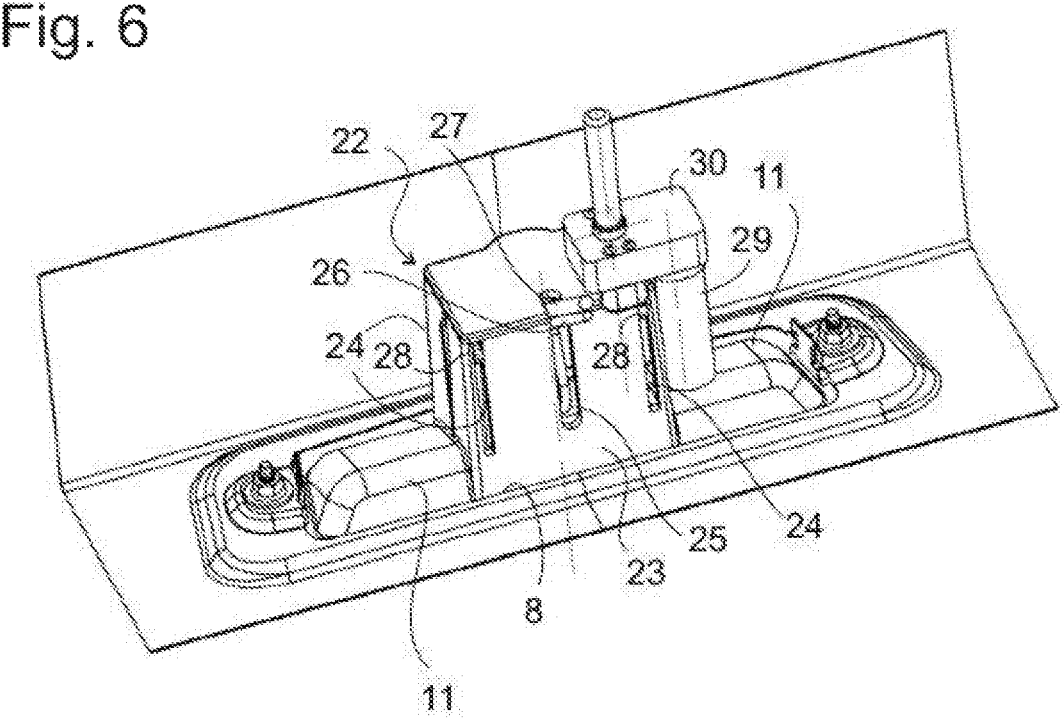
FIG. 6 is a detail similar to FIG. 2, seen from the vehicle interior.

FIG. 6 shows an extract of the outer skin element 5 and the camera assembly mounted thereon in a view from the direction of the vehicle interior. Clearly visible are the channel 11 and an approximately cuboid housing 22 delimiting the shaft 17, which housing 22 projects from a middle section of the channel 11 through the opening 8 into the interior of the tailgate 1. In a side wall 23 of the housing 22 facing the beholder, three elongated recesses 24, 24, 25 are formed. Through the middle recess 25, signal cables 26, 27 run to the switch 19 and to the camera 20. In the two lateral recesses 24, latching projections 28 of the mounting 21 engaging from the shaft 17 are visible. Latching projections of the mounting 21, mirrored regarding the latter, also engage in recesses 24 in a side wall of the housing 22 facing away from the beholder or facing the leg 6.

In an angle between the channel 11 and the housing 22, an electric motor 29 is mounted. A housing of a gear 30 is fastened on face ends of the electric motor 29 and of the housing 22 facing away from the channel 11. It includes two intermeshing gear wheels of which one is fastened to an output shaft of the motor 29 and the other one includes an internal thread and is rotatable about a threaded rod 31 (see FIG. 7) fastened to the mounting 21 thus converting a rotation of the motor 29 into a translation of the threaded rod 31 and of the mounting 21.

Figure 7:
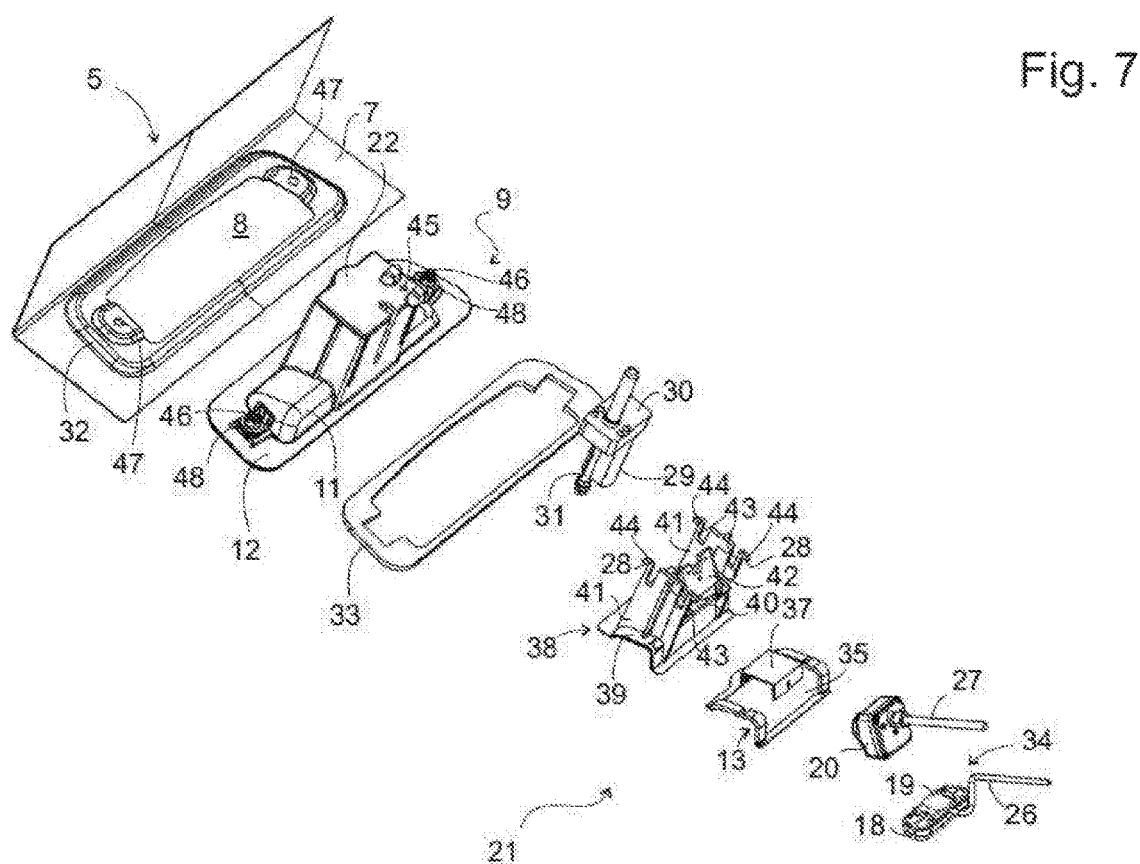
FIG. 7 shows an expanded representation of the component shown in FIG. 6.

FIG. 7 shows the outer skin element 5 and the various components of the camera assembly mounted thereon in an expanded representation. The pushbutton 18, the switch 19 and the signal cable 26 form a first assembly 34 which is provided in order to be mounted in a window 35 of the cover 13. The pushbutton 18 is smaller than the window 35, the gap between the pushbutton 18 and the edge of the window 35 can be filled out by a flexible seal which annularly extends about the pushbutton 18 and is fastened to the edge of the window 35 in a dirt and water-proof manner; in the representation of FIGS. 3 and 5, the seal 36 fills out the entire window 35 and covers the pushbutton 18. A lug 37, which projects from the edge towards the middle of the window 35 of the cover 13, is provided in order to mount the switch 19 on its bottom side.

The cover 13 and a guide part 38 together form the mounting 21. The guide part 38 includes a frame 39 which is curved complimentarily to the cover 13 and on which the cover 13 can be fastened in close contact for example by gluing or latching and two guide plates 41 standing away from the frame 39 on both sides of an opening 40 receiving the switch 19 and the lug 37. Between the guide blades 41 a carrier plate 42 for the fastening of the camera 20 is located. On the edges of the guide blades 41, elastic lugs 43 are cut free, the tips of which form the mentioned latching projections 28 engaging into the recesses 24. The latching projections 28 are provided with oblique flanks 44 on their side facing away from the cover 13 so that the lugs 33 when the mounting 21 is inserted in the shaft 17 of the molding 9 yield towards the center of the shaft 17 and, as soon as the latching projections 28 overlap with the recesses, again relax by engaging into these.

On the gear 30, the threaded rod 31 is visible which, when electric motor 29 and gear 30 are mounted on the housing 22, engages through a hole 35 in its front wall in the shaft 17 where it is fastened to the guide part 38.

Since the electric motor 29 and gear 30 do not protrude over the edges of the channel 10, the complete camera assembly consisting of molding 9, mounting 21, switch assembly 34 and camera 20 can be introduced from below into the opening 8 in a linear movement. In the process, two threaded rods 46 standing away from the flange 12 of the molding 9 engage in small openings 47 on both sides of the opening 8 of the outer skin element 5.

On the leg 7 of the outer skin element 5, an indentation 32 is stamped around the opening 8, which receives the flange 12 and a sealing ring 33 inserted between the flange 12 and the leg 7. With the help of nuts 48 screwed onto the threaded rods 46 the camera assembly is fastened to the leg 7 and the sealing ring 33 is compressed between the flange 12 and the leg 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A tailgate for a vehicle positionable between a closed position and an opened position, the tailgate comprising
   an outer skin having a grip recessed into the outer skin, wherein the grip opens downwardly when the tailgate is in the closed position; and
   a camera having an extendable mounting in the tailgate such that the camera is positionable between a retracted position wherein a cover conceals the camera and an extended position wherein the cover reveals the camera;
   wherein a wall of the recessed grip is at least partly formed by the cover of the camera in the retracted position, and
   wherein the cover comprises a first steep flank facing the vehicle interior and a second shallow flank facing the vehicle exterior forming a peaked cross section.

2. The tailgate according to claim 1, wherein the recessed grip is arranged in the middle on the outer skin.

3. The tailgate according to claim 1, wherein the cover further comprises a pushbutton configured to control a lock of the tailgate.

4. The tailgate according to claim 3, further comprising a switch installed actuatable by the pushbutton is installed in the mounting.

5. The tailgate according to claim 1, wherein the recessed grip further comprises a molding on which the mounting is moveably guided.

6. A tailgate for a vehicle positionable between a closed position and an opened position, the tailgate comprising
   an outer skin having a grip recessed into the outer skin, wherein the grip opens downwardly when the tailgate is in the closed position; and
   a camera having an extendable mounting in the tailgate such that the camera is positionable between a retracted position wherein a cover conceals the camera and an extended position wherein the cover reveals the camera;
   wherein a wall of the recessed grip is at least partly formed by the cover of the camera in the retracted position,
   wherein the recessed grip further comprises a molding on which the mounting is moveably guided, and
   wherein the molding comprises a channel disposed in an opening of the outer skin.

7. The tailgate according to claim 6, wherein the molding comprises a flange extending about the channel and covering an edge of the opening.

8. The tailgate according to claim 7, further comprising threaded rods standing away from the flange extend through openings of the outer skin.

9. The tailgate according to claim 6, wherein the molding comprises a shaft open towards the interior of the channel from which the camera is positionable between the retracted and extended position, wherein the camera is closed by the cover in the retracted position.

10. The tailgate according to claim 9, wherein the shaft comprising a wall having at least one elongated recess in a movement direction of the camera, and wherein the mounting comprises a projection which is resilient transversely to the wall and latched in the recess.

11. The tailgate according to claim 9, further comprising an elongated threaded rod extending in the movement direction configured to position the camera.

12. The tailgate according to claim 9, further comprising a motor configured to position the camera and accommodated in a location delimited by the shaft and a portion of the channel standing away from the shaft.

13. A tailgate for a vehicle positionable between a closed position and an opened position, the tailgate comprising
   an outer skin having a grip recessed arranged in the middle of outer skin, wherein the grip opens downwardly when the tailgate is in the closed position; and
   a camera having an extendable mounting in the tailgate such that the camera is positionable between a retracted position and an extended position;
   a cover at least partially forming a wall of the recessed grip and having a pushbutton configured to control a lock of the tailgate, the cover forming a peaked cross section and configured to conceal the camera in the retracted position and reveal the camera in the extended position;
   a switch installed in the mounting and actuatable by the pushbutton; and
   a molding having a channel disposed in an opening of the outer skin.

14. The tailgate according to claim 13, wherein the molding comprises a flange extending about the channel and covering an edge of the opening.

15. The tailgate according to claim 14, further comprising threaded rods standing away from the flange extend through openings of the outer skin.

16. The tailgate according to claim 13, wherein the molding comprises a shaft open towards the interior of the channel from which the camera is positionable between the retracted and extended position, wherein the camera is closed by the cover in the retracted position.

17. The tailgate according to claim 16, wherein the shaft comprising a wall having at least one elongated recess in a movement direction of the camera, and wherein the mounting comprises a projection which is resilient transversely to the wall and latched in the recess.

18. The tailgate according to claim 16, further comprising an elongated threaded rod extending in the movement direction configured to position the camera.

19. The tailgate according to claim 16, further comprising a motor configured to position the camera and accommodated in a location delimited by the shaft and a portion of the channel standing away from the shaft.

* * * * *